(12) United States Patent
Morita et al.

(10) Patent No.: US 6,786,958 B2
(45) Date of Patent: Sep. 7, 2004

(54) INK FOR OIL-BASED BALL PEN

(75) Inventors: Masaaki Morita, Sawa-gun (JP); Susumu Suzuki, Fujioka (JP); Toshiaki Takayanagi, Yokohama (JP); Kyoko Kobayashi, Fujioka (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 41 days.

(21) Appl. No.: 10/220,813

(22) PCT Filed: Mar. 27, 2001

(86) PCT No.: PCT/JP01/02488
§ 371 (c)(1),
(2), (4) Date: Sep. 6, 2002

(87) PCT Pub. No.: WO01/72914
PCT Pub. Date: Oct. 4, 2001

(65) Prior Publication Data
US 2003/0033959 A1 Feb. 20, 2003

(30) Foreign Application Priority Data
Mar. 27, 2000 (JP) ........................................ 2000-087318

(51) Int. Cl.$^7$ ............................................... C09D 11/16
(52) U.S. Cl. ............................... 106/31.64; 106/31.28; 106/476
(58) Field of Search ........................... 106/31.64, 31.28, 106/476

(56) References Cited

U.S. PATENT DOCUMENTS

| | | | |
|---|---|---|---|
| 5,326,866 A | * | 7/1994 | Ono et al. .................. 534/792 |
| 5,366,543 A | * | 11/1994 | Ono et al. ............... 106/31.41 |
| 6,019,829 A | * | 2/2000 | Omae et al. .............. 106/31.65 |
| 6,479,568 B1 | * | 11/2002 | Fujii et al. ................... 523/161 |

FOREIGN PATENT DOCUMENTS

| | | |
|---|---|---|
| JP | 62-007775 | 1/1987 |
| JP | 11-293174 | 10/1999 |
| JP | 2000-212496 | 8/2000 |

* cited by examiner

Primary Examiner—Mark L. Bell
Assistant Examiner—Veronica F. Faison
(74) Attorney, Agent, or Firm—Burns, Doane, Swecker & Mathis, L.L.P.

(57) ABSTRACT

Provided is an oil based ink for a ball-point pen comprising at least an alcohol-soluble dye, carbon black, a resin and an organic solvent, wherein the carbon black described above has a DBP oil absorption of 80 cc/100 g or less. The carbon black has preferably a particle diameter of 30 mμ or less and a content of 1 to 15 mass % based on the total amount of the ink.

4 Claims, No Drawings

INK FOR OIL-BASED BALL PEN

TECHNICAL FIELD

1. Field of the Invention

The present invention relates to an oil based ink for a ball-point pen, specifically to an oil based ink for a ball-point pen in which an alcohol-soluble dye is used in combination with carbon black as a coloring material and which is excellent in stability with the passage of time.

2. Background Art

An oil based ink for a ball-point pen in which an oil-soluble dye is used in combination with carbon black is disclosed in Japanese Patent Application Laid-Open No. Hei 11-293174.

However, carbon black is no more than being described in the examples in this official gazette, and it is understood as if carbon blacks of all grades can be used. In many cases, however, when carbon blacks are used for an oil based ink for a ball-point pen, caused are the problems in that the ink is short of stability with the passage of time and that when the ball-point pen is used for a long time, the ink discharge amount is reduced to a large extent or on the contrary, it grows large in a certain case.

On the other hand, the advantage that an alcohol-soluble dye is used in combination with carbon black resides in the point that problems which are difficult to overrcome by themselves alone can be solved by making best use of the merits thereof each other. For example, if only an alcohol-soluble dye is used, drawn lines are a little inferior in fastness such that the lines drawn on paper are eluted or decolored by alcohol base solvents (alcohol resistance) or oxidation-reduction agents (chemical resistance) or that when exposed to sunlight, they are faded or decolored in a short time (light fastness). Accordingly, in order to obtain good drawn line fastness, particularly good light resistance, a metal-containing dye containing chromium, which is a heavy metal, in a dye skeleton has to be used in a large amount, so that likely to be caused is an environmental problem such as leaking of chromium, though a trace amount, into the environment due to incineration treatment.

Further, a Nigrosine base dye is available as a black dye having very high fastness, but this dye has a peculiar odor, and therefore there is a problem in that it is unpleasantly felt for some users in writing.

In contrast with this, when only carbon black is added to an ink in an amount sufficient for obtaining a practically satisfactory drawn line density, it is difficult in practice to industrially produce a carbon black dispersion having a high concentration. The ink is inferior in stability with the passage of time and falls into an unwritable state in a very short period of time, and it has a problem in cost. Further, when priority is put on stability with the passage of time, a sufficiently large amount of carbon black can not be contained in an ink, so that the drawn lines are light and the ink does not stand practical use.

In light of the problems described above, the present invention is intended for solving them, and an object thereof is to provide an oil based ink for a ball-point pen which is excellent in stability with the passage of time in a combined use system of an alcohol-soluble dye and carbon black and which has less change in a discharge amount when a ball-point pen is used for a long time.

DISCLOSURE OF THE INVENTION

Intensive researches repeated by the present inventors in order to solve the problems described above have resulted in finding that an ink is excellent in stability with the passage of time when carbon black used has a DBP oil absorption of 80 cc/100 g or less and that a change in the discharge amount in using a ball-point pen for a long time is smaller when it has a particle diameter of 30 m$\mu$ or less, and thus the present invention has come to be completed. Further, it has been found that if carbon black contained in the ink has a content of 1 to 15 mass %, the sufficiently high fastness is obtained and the stability with the passage of time is much more improved and that a change in the discharge amount caused when the ball-point pen is used for a long time is less.

That is, the present invention comprises:
(1) an oil based ink for a ball-point pen comprising at least an alcohol-soluble dye, carbon black, a resin and an organic solvent, wherein the carbon black described above has a DBP oil absorption of 80 cc/100 g or less,
(2) the oil based ink for a ball-point pen as described in the above item (1), wherein the carbon black has a particle diameter of 30 m$\mu$ or less, and
(3) the oil based ink for a ball-point pen as described in the above item (1) or (2), wherein the carbon black has a content of 1 to 15 mass % based on the total amount of the ink.

The oil based ink for a ball-point pen according to the present invention can provide an oil based ink composition for a ball-point pen which is excellent in stability with the passage of time and which has less change in a discharge amount in use of a ball-point pen by regulating the characteristics of carbon black used.

BEST MODE FOR CARRYING OUT THE INVENTION

The embodiment of the present invention shall be explained below in details.

The DBP oil absorption of carbon black described in the present invention means a volume (cc) of dibutyl phthalate (DBP) which is adsorbed on 100 g of carbon black, and it shows primarily a structure (three-dimensional state of an aggregate of primary particles) of carbon black.

The particle diameter of carbon black means an average value of diameters of primary particles of carbon black which is measured by magnifying under an electron microscope.

In the present invention, it is not sure why the excellent stability with the passage of time is obtained when carbon black having a DBP oil absorption of 80 cc/100 g or less, preferably 80 cc/100 g to 40 cc/100 g is used unlike other carbon blacks. However, carbon black having a DBP oil absorption exceeding 80 cc/100 g exhibits a higher viscosity when dispersed because of a larger structure thereof, and a required amount of a binder grows larger as well. This is considered to be a factor for deteriorating the stability with the passage of time.

It is not certain either why when carbon black having a particle diameter of 30 m$\mu$ or less is used, a change in the discharge amount caused when a ball-point pen is used for a long time is small. However, when hard particles such as carbon black are present in an ink, they work as if they are abrasive particles in a tip in writing, whereby the tip is abraded in an inside thereof, and the respective parts cause a dimensional change to a large extent as compared with the original. This causes a change such as a reduction or an increase in the discharge amount in a certain case, and it is considered that when carbon black has a particle diameter of 30 m$\mu$ or less, it is sufficiently small as an abrasive particle and therefore provides less abrasion, so that a large dimensional change is not caused. As a result, it is considered that a large change in the discharge amount is not observed even when the ball-point pen is used for a long time. Further, selection of carbon black having a BET specific surface area of 100 m²/g or less among these carbon blacks makes it possible to readily control a viscosity of the ink.

The alcohol-soluble dye used in the present invention includes Aizen Spilon Yellow C-2GH, Aizen Spilon Yellow C-GNH, Aizen Spilon Red C-GH, Aizen Spilon Red C-BH, Aizen Spilon Violet C-RH, Aizen Spilon Blue C-RH, Aizen S.B.N. Blue 701, S. B. N. Yellow 530, S. B. N. Violet 510, Valifast Yellow 1110, Valifast Yellow 3150, Valifast Violet 1701, Valifast Violet 1702 and Valifast Red 1360.

These alcohol-soluble dyes each may be used alone or in a mixture of two or more kinds thereof. These alcohol-soluble dyes are added preferably in a range of 5 to 50 mass %, preferably 15 to 40 mass % based on the total mass of the ink composition. If the blending amount is less than 5 mass %, the drawn line density becomes light. On the other hand, if it exceeds 50 mass %, an adverse effect is exerted on the other blended components.

Carbon black used for the ink composition of the present invention includes, for example, pigments such as Reagal 400R and Mogul L manufactured by Cabot Co., Ltd., Printex 25, Printex 35, Printex 45, Printex 55, Printex 75, Printex 85 and Special Black 550 manufactured by Degussa AG and #33, #44, #45, #52, #45L, #50, #900, #970, #1000, #2300, #2350, MA7, MA8, MA11 and MCF88 manufactured by Mitsubishi Chemical Corporation.

A blending amount of the coloring material of these alcohol-soluble dye and carbon black falls in a range of 6 to 65 mass %, preferably 20 to 50 mass % in total based on the total mass of the ink composition. In this case, a blending amount of carbon black falls in a range of 1 to 15 mass %, preferably 5 to 10 mass % based on the total mass of the ink composition. If a blending amount of the coloring material is less than 6 mass %, the density of drawn lines in writing is light and therefore is not practical. On the other hand, if it exceeds 65 mass %, a reduction in a solvent caused by volatilization gives rise to a large problem in the stability with the passage of time because the viscosity of the ink rises and the solubility of the coloring material becomes short. Further, if a blending amount of carbon black is less than 1 mass %, the drawn lines are short of fastness, and it is particularly difficult to visually observe the drawn lines remaining in an alcohol resistance test. On the other hand, if it exceeds 15 mass %, a pseudo-plasticity of the ink is strengthened, and followability of the ink in quickly writing is deteriorated or an adverse effect is exerted on the stability with the passage of time.

An organic solvent is used for the ink composition of the present invention in order to dissolve or disperse the coloring material described above. In this case, used as the organic solvent is an organic solvent which is used for a conventional oil based ink for a ball-point pen, that is, an organic solvent which dissolves or disperses the coloring material described above and which has a relatively high boiling point. Such solvent includes, for example, benzyl alcohol, phenoxyethanol, carbitols and cellosolves. They may be used alone or in a mixture of two or more kinds thereof, and a blending amount thereof falls preferably in a range of 20 to 70 mass % based on the total amount of the ink composition of the present invention. In this case, if it is 20 mass % or less, it is not preferred in terms of a solubility of the coloring material and others. On the other hand, if it is 70 mass % or more, it is not preferred either in terms of a shortage of the colorant resulting in insufficient density of the drawn lines.

Further, a resin may be added as a dispersant or a viscosity-controlling agent to the ink composition of the present invention, and capable of being given as the examples thereof are resins used for conventional oil based ink compositions for a ball-point pen, for example, ketone resins, acetophenone resins, sulfamide resins, maleic acid resins, butyral resins, ester gums, xylene resins, alkyd resins, phenol resins, rosin resins, polyvinylpyrrolidone resins and modified resins thereof. These resins may be used alone or in a mixture of two or more kinds thereof.

These resins have a content of 5 to 30 mass % based on the total amount of the ink composition. In this case, if it is 5 mass % or less, it is not preferred in that the viscosity of a minimum required limit is not obtained. On the other hand, if it is 30 mass % or more, it is not preferred either in that the resulting viscosity becomes too high. Capable of being added, if necessary, to the ink composition of the present invention are, in addition to the essential components described above, other additives used for a conventional oil based ink for a ball-point pen, for examples, fatty acids, phosphoric acid ester base lubricants, surfactants, rust preventives, antioxidants and lubricating oils.

EXAMPLES

The present invention shall be explained below in further details with reference to examples, comparative examples and test examples, but the present invention shall by no means be restricted by these examples.

Examples 1 to 4 and Comparative Examples 1 to 4

Produced by the following production process were oil-based inks for a ball-point pen comprising in combination respective components of alcohol-soluble dyes, various carbon blacks, solvents, resins and lubricants. In producing the inks, carbon black was first dispersed using a butyral resin as a dispersant by a usually well known method, for example, by means of a ball mill or a three roll mill and transferred into a vessel equipped with a reflux condenser and a stirrer, and then the other components were added thereto and stirred at 60° C. for 10 hours. Impurities were removed by pressure filtration to prepare oil-based inks for a ball-point pen of Examples 1 to 4 and Comparative Examples 1 to 4 shown in Table 1. Numerical values in the compositions shown in Table 1 show mass parts.

TABLE 1

| | | | DBP oil absorption | Particle diameter | Example | | | | Comparative Example | | | |
|---|---|---|---|---|---|---|---|---|---|---|---|---|
| | | Raw material name | (cc/100 g) | (mµ) | 1 | 2 | 3 | 4 | 1 | 2 | 3 | 4 |
| Colorant | Carbon black | Printex 25[‡1] | 46 | 56 | 10.0 | | | | | | | |
| | | Printex 45[‡1] | 52 | 26 | | 8.0 | | 25.0 | | | | |
| | | #33[‡2] | 76 | 28 | | | 13.0 | | | | | |
| | | Carbon black LT[‡1] | 125 | 35 | | | | | 10.0 | | | |
| | | MA100[‡2] | 100 | 22 | | | | | | 8.0 | | |
| | | Printex 95[‡1] | 100 | 15 | | | | | | | 13.0 | |

TABLE 1-continued

| | | Example | | | | Comparative Example | | | |
|---|---|---|---|---|---|---|---|---|---|
| | Raw material name | 1 | 2 | 3 | 4 | 1 | 2 | 3 | 4 |
| Alcohol-soluble dye | Aizen Spilon Violet C-RH‡3 | 15.0 | 16.0 | | | 10.0 | 10.0 | 15.0 | 16.0 |
| | Aizen Spilon Yellow C-2GH‡3 | 6.0 | | | | 4.0 | 6.0 | 6.0 | 4.0 |
| | Aizen Spilon Yellow C-GNH‡3 | | 5.0 | | | | 5.0 | | 10.0 |
| Solvent | Benzyl alcohol | 10.5 | 6.0 | 10.0 | 6.0 | 4.5 | 12.0 | 15.0 | 10.5 |
| | 2-Phenoxyethanol | 45.0 | 45.5 | 42.5 | 27.0 | 45.0 | 45.5 | 42.5 | 40.0 |
| | Tripropylene glycol n-butyl ether | | 6.0 | 5.0 | 10.0 | 6.0 | | | |
| Resin | Denka Butyral #2000-L‡5 | 2.0 | | 2.0 | 4.5 | 2.0 | | 2.0 | |
| | S-leck B BL-1‡6 | | 2.0 | | | | 2.0 | | |
| | Synthetic Resin SK‡4 | 8.0 | 11.0 | 10.0 | 8.0 | 8.0 | 11.0 | 10.0 | 16.0 |
| | PVP K90‡7 | 0.5 | | 0.5 | 0.5 | 0.5 | | 0.5 | 0.5 |
| | PVP K120‡7 | | 0.5 | | | | 0.5 | | |
| Lubricant | Oleic acid | 3.0 | | 3.0 | 3.0 | 3.0 | | 3.0 | 3.0 |
| Total | | 100.0 | 100.0 | 100.0 | 100.0 | 100.0 | 100.0 | 100.0 | 100.0 |

‡1 manufactured by Degussa AG
‡2 manufactured by Mitsubishi Chemical Corporation
‡3 manufactured by Hodogaya Chemical Co., Ltd.
‡4 manufactured by Clariant Co., Ltd.
‡5 manufactured by Denki Kagaku Kogyo Kabushiki Kaisha
‡6 manufactured by Sekisui Chemical Co., Ltd.
‡7 manufactured by ISP Co., Ltd.

The respective oil-based inks for a ball-point pen prepared by the process described above were filled into a refill having a polypropylene tube and a stainless tip (a ball is made of hard metal and has a diameter of 0.7 mm), and this was then incorporated into a commercially available barrel of SA-R manufactured by Mitsubishi Pencil Kabushiki Kaisha and finished into oil-based ball-point pens. These refills or oil-based ball-point pens were used to carry out the following tests of stability with the passage of time and the like.

1) Test of Stability with the Passage of Time

The fifteen refills described above per each ink were stored for 3 months in a constant temperature and constant humidity bath of 50° C. and 80% RH, and each 5 refills were taken out every month and left to cool down to room temperature. Then, they were used for writing spirals with a hand to inspect a writing property according to the following criteria:

⊙: capable of writing as well as before the test
○: a little change observed as compared with before the test
Δ: starving is caused
□: starving is heavy
X: incapable of writing 2) Change in Discharge Amount The five oil-based ball-point pens were used for writing up to 1000 m under the conditions of a load of 200 g, a writing angle of 70° and a writing speed of 4.5 m/minute by means of a writing test machine while measuring the discharge amount for every 100 m, and a discharge amount of the ink in 0 to 100 m was compared with a discharge amount of the ink in 900 to 1000 m to judge the performance by the difference thereof:

⊙: difference is ±2 mg or less
○: difference is ±5 mg or less
Δ: difference is +10 mg or less
□: difference exceeds ±10 mg
X: incapable of writing in 900 to 1000 m 3) Fastness of Drawn Lines A piece of paper cut out from the paper having the drawn lines obtained in 2) described above was immersed in ethanol for a whole day and night and taken out, and it was dried and then visually observed a state of the drawn lines:

○: firm drawn lines can be observed
Δ: faint drawn lines remain
X: drawn lines flow out and can not be observed The evaluation results thereof are shown in Table 2.

TABLE 2

| | | Test of stability with the passage of time | | | Change in discharge amount | Fastness of drawn lines |
|---|---|---|---|---|---|---|
| | | 1 M | 2 M | 3 M | | |
| Example | 1 | ⊙ | ⊙ | ○ | Δ | ⊙ |
| | 2 | ⊙ | ⊙ | ⊙ | ⊙ | ⊙ |
| | 3 | ⊙ | ⊙ | ⊙ | ○ | ⊙ |
| | 4 | ⊙ | ○ | Δ | Δ | ⊙ |
| Comparative Example | 1 | ⊙ | ○ | X | □ | ⊙ |
| | 2 | Δ | □ | X | □ | ⊙ |
| | 3 | ○ | Δ | □ | □ | ⊙ |
| | 4 | ⊙ | ⊙ | ⊙ | ⊙ | X |

INDUSTRIAL APPLICABILITY

The oil-based ink for a ball-point pen according to the present invention is excellent in stability with the passage of time and suited as an oil-based ink for a ball-point pen having less change in the discharge amount when a ball-point pen is used for a long time.

What is claimed is:

1. An oil based ink for a ball-point pen comprising at least an alcohol-soluble dye, carbon black, a resin and an organic solvent, wherein the carbon black described above has a DBP oil absorption of 80 cc/100 g or less.

2. The oil based ink for a ball-point pen as described in claim 1, wherein the carbon black has a particle diameter of 30 m$\mu$ or less.

3. The oil based ink for a ball-point pen as described in claim 2, wherein the carbon black has a content of 1 to 15% by mass based on the total amount of the ink.

4. The oil based ink for a ball-point pen as described in claim 1, wherein the carbon black has a content of 1 to 15% by mass based a total amount of the ink.

* * * * *